Feb. 5, 1924.

H. S. FRANK

PROCESS OF MEASURING PISTON RINGS

Filed April 21, 1920

1,482,392

Inventor
Harry S. Frank
By his Attorney
Paul M. Klein

Patented Feb. 5, 1924.

1,482,392

UNITED STATES PATENT OFFICE.

HARRY S. FRANK, OF WOODMERE, NEW YORK.

PROCESS OF MEASURING PISTON RINGS.

Application filed April 21, 1920. Serial No. 375,538.

*To all whom it may concern:*

Be it known that I, HARRY S. FRANK, citizen of the United States, and resident of Woodmere, Long Island, in the county of Nassau and State of New York, have invented certain new and useful Improvements in Processes of Measuring Piston Rings, of which the following is a specification.

This invention relates to a process or method of measuring piston rings.

It has for its objects to render such work more expeditious, precise, absolutely reliable and last but not least render the taking of measurements under my method readily visible for persons not skilled in the art.

Heretofore the general practice of measuring the true shape of a split or severed piston ring has been inaccurate and depended upon the skill of the tester to determine the deviations of a ring's circumferential surface in relation with a cylinder of the size for which the ring is intended.

In order to bring forth the marked advantages of my method it becomes necessary to explain the present way of measuring the fitness and relative expansion of a ring in a cylinder and compare it with my improved process.

The ordinary manner now adopted consists in compressing the severed ring into a receiver of the exact size or diameter for which the ring is intended, holding the receiver with the compressed ring therein against a light source and judging by the space or spaces left free between the ring and the receiver the amount of deviation or fitness of the ring. Such method is firstly inaccurate and depends entirely upon the skill and opinion of the tester, and secondly it is erroneous in theory and principle as will be explained later.

The underlying principle of a true fit of a piston ring in a cylinder is the uniform expansion of the ring and the consequent perfect contact of all points of its circumference with the cylinder wall. It is a well known fact that the escape of gas through the severed ends of the ring is practically negligible compared with the leakage around the ring's circumference caused by unequal expansion and the consequent untrue fit of the ring's circumferential surface with the cylinder wall.

While the heretofore used method detects only comparatively large defects of the ring, in a rough and almost unmeasurable way, aside from the fact that this method is fundamentally incorrect, it prevents in its principle the true ascertaining of the natural expansion of the ring upon which not only the theory but also the practice of the correct fitness of a ring in a cylinder is based.

Experience has taught me that the foregoing method is erroneous because of the fact that it does not permit the ring to take its natural shape, and therefore, prevents the exact determination of defect or trueness of each individual point of its circumferential surface.

In order to detect the comparative deviation between all circumferential points of a ring, I have devised a method whereby such deviation may be measured directly and without depending upon the skill and subjective opinions of testers.

My process involves the broad and basic principle of taking measurements of a ring which, while compressed to its supposedly correct size for which it is intended, may take its natural shape without interfering with its peculiar state of compression.

While the above principle is basic to my method the desired results may be obtained in various ways. Likewise the taking of measurements leading directly or indirectly to the determination of the true shape of a ring may be manifold and may be employed either singly or in any preferred combination.

When a severed or split ring is compressed to its supposedly correct size (corresponding to that of the cylinder for which the ring is intended) within a flexible binder, the ring will retain its natural shape, subject, of course, to its compressed state. Any defects or deviations of the thus flexibly compressed ring may be easily determined by successively measuring the diameters of the ring at and from each point of the ring's circumferential surface with any suitable instrument or handy tool.

Similar results may be obtained by centering the flexibly compressed ring and measuring its radii from each point of its circumferential surface. The tying, binding or flexibly compressing, as I choose to call it, may be accomplished in different ways, for instance by winding around the ring a cord, or a wire, or compressing it into a flexible chain the inner circumference of which corresponds exactly to that of the cylinder for which the ring is intended.

Still another way of determining the ring's true shape is to first compress the ring within a rigid receiver of the exact size or diameter for which the ring is intended, tying the thus rigidly compressed ring with a flexible binder corresponding in size or circumferential length with that of the rigid receiver, centering the thus rigidly compressed ring, retaining the thus centered ring in the supposedly correctly centered position, releasing it from the rigid receiver but leaving it compressed in the flexible binder, revolving the ring around its supposedly correct center and following the ring's circumferential surface with an indicator of any desired design or form.

A radially movable pin loosely but permanently resting upon the ring's circumference, while the ring is being revolved, may serve such purpose. There is in existence a number of instruments which may be readily adapted to take the place of such a pin and which graphically register any deviation of the moving surface of the ring.

For better understanding the principle of my method generally described in the foregoing preamble and in order to point out more clearly the first mentioned and other objects of my invention, I will refer to the accompanying drawings, forming part of this specification, but serving solely for explanatory purposes.

Figure 1:
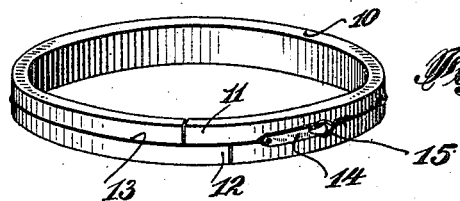
Figure 1 represents a perspective view of a severed piston ring tied with a flexible binder to its supposedly correct working diameter.

Referring to the figures, the numeral 10 indicates a split or severed piston ring with its severed ends 11 and 12 drawn together by a cord, wire, or other flexible but unyielding means 13, permanently attached at one end to a tightening device 14 while the other free end engages a hook-like form 15 which facilitates the adjustment of the cord.

Figure 2:
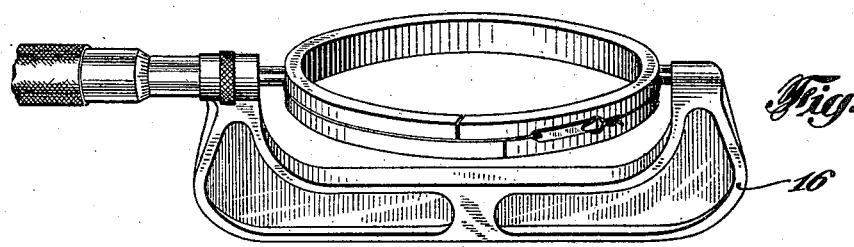
Figure 2 illustrates a flexibly compressed ring, the diameter of which is being measured with a micrometer.
Figures 3, 4, 5:
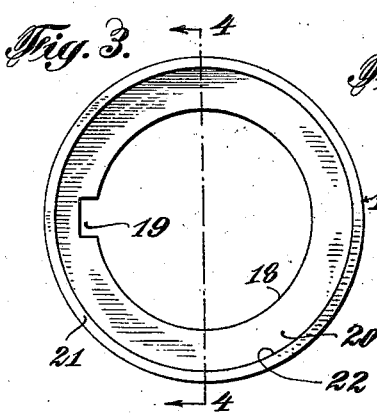
Figure 3 represents a plan view of a rigid ring receiver.
Figure 4 is a sectional view of same taken on line 4—4 of Figure 3.
Figure 5 illustrates a rigid receiver into which a ring was pressed to its supposedly correct working size.
Figure 6:
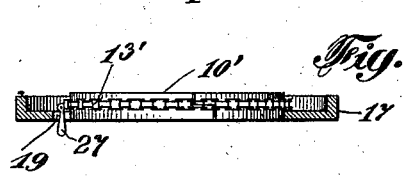
Figure 6 is a sectional view through such rigid receiver with a ring therein around which a flexible binder is tied.

The rings shown in Figures 1 and 2 are compressed to their supposedly correct working shape or working diameter in their flexible binders 13 which permits the rings to retain their natural shapes while thus flexibly compressed. It is obvious that by successively taking diametrical measurements at all circumferential points of such flexibly compressed ring will bring forth quite different results than if such measurement would be taken of a ring compressed in a rigid receiver of the exact size for which the ring is intended.

While numeral 16 indicates a micrometer used for measuring the ring's diameter it is self-evident that a caliper, a scale or another suitable instrument may be employed for the identical purpose.

Having carefully completed the diametrical measurments of a ring in the way indicated it will be found that the various differences resulting therefrom will prove quite interesting especially when measuring commonly fabricated rings, where no scientific methods were employed.

The resultant deviations are directly related to the proper expansion qualities of a ring and these indicate the degree of precision with which the ring will operate in a cylinder for which it is intended.

The circumferential deviations of a ring may be ascertained also in different other ways, all adhering, however, to the basic principle of my processes of taking the ring's measurements while the ring is subjected to the "flexible compression" explained above.

In order to make the process more expeditious, without, of course impairing its precision, but on the contrary adding to it greater reliability and practicability, I have devised an apparatus for measuring the radii, of the circumferential deviations of a piston ring, the principle of which device may be readily understood from Figures 3 to 8 of the drawings.

The annular receiver 17 represents rigid compressing means provided with a circular opening 18 of exactly the size and correct diameter for which the ring is intended. This opening represents the bore of a cylinder. A notch 19, the purpose of which will be explained later, is provided in annular flange 20 of the receiver, which terminates at its outer circumference in a concentric, accurately ground bead 21. The inner surface 22 of the bead fits precisely upon the outer concentric surface 23 of disk 24 (Figs. 7 and 8) which is rotatably mounted on a base plate 25.

The ring 10′ is forced into the circular aperture 18 of the rigid receiver 17 while the latter rests upon a perfectly flat surface with its bead 21 directed upwards. Then a flexible but unyielding binder 13′ is placed around the ring. This binder or tie may be made in any suitable form and of any desired material. In the drawings a link chain is shown the ends of which are connected by an adjustable link indicated at 26 and having a hinged handle 27, by turning of which the chain may be adjusted. The aforementioned recess 19, provided at the flange of the rigid receiver, serves for facilitating the operation of the handle 27 when the ring is placed upon the disk 24.

Figure 7:
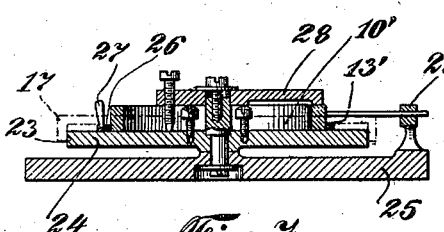
Figure 7 represents a sectional view of a device for centering and revolving a flexibly compressed ring and measuring its circumferential deviations.

In Figure 7 the dashed and dotted lines indicate the receiver during the operation of setting the ring concentrically upon disk 24. It may be observed that the receiver flange 20 forces the flexible binder 13' against the disk and causes the ring 10' to protrude upwards.

In this way the ring is placed into its supposedly correct centered position.

Figure 8:
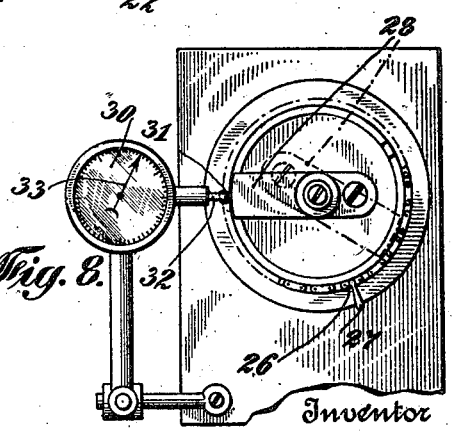
Figure 8 is a plan view of another ring measuring device.

When this is done a centrally held clamp 28 is pressed down at one point of the ring, firmly holding the latter against disk 24. The point at which the ring is held may vary. In Figure 8 the clamp 28, drawn in full lines, presses the ring down at a point substantially opposite its severed ends, while the dashed and dotted lines indicating the clamp, show the latter holding the ring at one of its severed ends.

After clamping the ring to the rotatable disk 24 the rigid receiver 17 is withdrawn and the ring is permitted to assume its natural shape within the flexible binder, the inner circumference of which corresponds exactly to that of the circular opening in the rigid receiver.

The handle 27 of the adjustable link 26 is now turned down against and upon the face of the disk. A deviation or radii indicator, seen at 29 of Figure 7, is placed against the ring, and the disk is slowly revolved. In this manner readings may be taken at every point of the circumferential surface of the ring and its radii and the variation in their dimensions may be determined.

Since the simplicity and crudeness of the indicator seen in Figure 7 may make it difficult to take such readings, although they may be taken with but little patience, more complex and readily perceptible indicators may be employed as shown at 30 in Figure 8. Such and similar devices are on the market and may be easily obtained.

By providing a small roller 31 at the end of the laterally movable pin 32 actuating the indicator hand 33 still more favorable results may be obtained as the friction between the ring and the indicator pin is reduced to a minimum.

The dial of the indicator is divided in thousandth of an inch and any readings obtained by revolving the ring are expressed directly in familiar figures.

In such a way the measuring of the various deviations of the circumferential surface of a ring may be easily made, and from these measurements may be deduced the true shape, the total difference of deviation, the future true fit in a cylinder, the degree of future uniform expansion, the degree of concentricity and many other important features of a piston ring.

Such measurements come particularly to prominence in cases of comparison between rings of various manufacture and when it becomes necesary to prove deviations and the consequent imperfection of rings prior to their being put in use.

I wish to emphasize the fact that, while I have shown in the drawings preferred forms of apparatus adapted to facilitate the execution of my process, employment of these devices is absolutely not necessary for accomplishing the identical results.

Having thus described my invention, I claim:

1. The process of measuring the true shape of a split piston ring which comprises compressing the ring to its supposedly correct working size within a rigid receiver having an opening of the exact size for which the ring is intended, firmly tying a flexible tie around the compressed ring, releasing the tied ring from the rigid receiver and successively measuring the ring's diameters at diametrically opposite points of its circumference.

2. The process of determining the true shape of a severed ring, which comprises compressing it to its supposedly correct working shape within a rigid form of the exact size for which the ring is intended, firmly tying the thus compressed ring with a flexible, but nonexpandible tie, removing the thus tied ring from the rigid form and successively measuring many of the ring's radii.

3. The method of proving deviation from true concentricity of a compressed severed ring, which comprises subjecting it to compression to its supposedly true, rigid working shape, changing this rigid compression to a flexible, but otherwise unyielding one, and subjecting the thus flexibly compressed ring to a series of diametrical, radial or circumferential measurements determining its true shape.

4. The process of ascertaining by measuring the expansion of a severed piston ring in a cylinder prior to being put therein, which comprises tying or binding a compressed ring, kept in a rigid holder corresponding exactly in size to that of the cylinder, with a flexible, unyielding tie, releasing it from its rigid holder, revolving it around its supposedly correct center, and successively following substantially all points of its circumferential surface with a deviation indicator.

5. The process of ascertaining by indication the future expansion of a piston ring in a cylinder which comprises binding with a flexible, unyielding tie a ring compressed in a rigid holder of exactly the size of the cylinder, releasing it from the rigid holder, revolving it while tied at its supposedly correct center, and successively bringing substantially all points of the revolving ring's circumferential surface in contact with a relatively stationary deviation indicator.

6. The process of indirectly ascertaining the true fit of a severed piston ring in a cylinder which comprises closing the ring to its supposedly correct size corresponding to that of the cylinder, keeping the ring closed by a flexible but unyielding tie, revolving the compressed and flexibly tied ring around its supposedly correct center, and measuring the deviations of its circumferential surface while the ring is being revolved.

7. The process of measuring the trueness of a piston ring in a flexible tie, which comprises compressing a ring into rigid means corresponding in size to that for which the ring is intended, retaining the ring in compression by flexible but unyielding means, releasing the ring of the former compressing means while keeping it compressed by the latter, and successively measuring the ring's diameters, radii and circumferential deviations at numerous points of its outer surface.

8. The process of indirectly proving the exactness of expansion of a piston ring in a cylinder, which comprises rigidly compressing the ring to its supposedly exact size for which it is intended, tying the rigidly compressed ring by a flexible, but unyielding binder, centering the compressed and tied ring, releasing it, after being centered, from its rigidly compressed state to its flexibly compressed natural shape, revolving the ring while in its natural, compressed shape and following its circumference with a deviation indicator disposed radially and operating in radial direction toward and from the supposedly correct center of the ring.

Signed at New York, in the county of New York and State of New York, this 31st day of March, A. D. 1920.

HARRY S. FRANK.